(12) United States Patent
Oqab et al.

(10) Patent No.: US 11,099,556 B2
(45) Date of Patent: Aug. 24, 2021

(54) DYNAMIC RACE COURSE USING AN AIRCRAFT SYSTEM SWARM

(71) Applicant: COLUMBIAD LAUNCH SERVICES INC., Kitchener (CA)

(72) Inventors: Haroon B. Oqab, Hamilton (CA); George B. Dietrich, Kitchener (CA)

(73) Assignee: COLUMBIAD LAUNCH SERVICES INC., Kitchener (CA)

( * ) Notice: Subject to any disclaimer, the term of this patent is extended or adjusted under 35 U.S.C. 154(b) by 0 days.

(21) Appl. No.: 16/979,277

(22) PCT Filed: Mar. 8, 2019

(86) PCT No.: PCT/IB2019/051912
§ 371 (c)(1),
(2) Date: Sep. 9, 2020

(87) PCT Pub. No.: WO2019/171350
PCT Pub. Date: Sep. 12, 2019

(65) Prior Publication Data
US 2020/0401131 A1 Dec. 24, 2020

Related U.S. Application Data

(60) Provisional application No. 62/640,802, filed on Mar. 9, 2018.

(51) Int. Cl.
*G05D 1/00* (2006.01)
*G05D 1/10* (2006.01)
(Continued)

(52) U.S. Cl.
CPC ............. *G05D 1/0027* (2013.01); *A63K 1/00* (2013.01); *B64C 39/024* (2013.01); *G05D 1/104* (2013.01);
(Continued)

(58) Field of Classification Search
CPC ...... B64C 39/024; G05D 1/00; G05D 1/0027; G05D 1/106; G05D 1/104; G05D 2201/12;
(Continued)

(56) References Cited

U.S. PATENT DOCUMENTS 5,521,817 A * 5/1996 Burdoin ............... G05D 1/0027
244/190
9,104,201 B1 8/2015 Pillai et al.
(Continued)

FOREIGN PATENT DOCUMENTS

WO  WO-2016198090 A1  12/2016
WO  WO-2018009950 A1  1/2018

OTHER PUBLICATIONS

PCT/IB2019/051912, Dynamic Race Course Using an Aircraft System Swarm, Mar. 8, 2019.
(Continued)

*Primary Examiner* — Yonel Beaulieu
(74) *Attorney, Agent, or Firm* — Perry + Currier Inc.

(57) ABSTRACT

An example system for racing aircraft systems includes: a plurality of autonomous synchronized unmanned aircraft systems configured to form a swarm at a race course through which the aircraft systems are to navigate; and a controller configured to be operatively coupled to at least one unmanned aircraft system of the swarm, the controller configured to control the swarm to form an element of the race course.

22 Claims, 5 Drawing Sheets

(51) Int. Cl.
*A63K 1/00* (2006.01)
*B64C 39/02* (2006.01)

(52) U.S. Cl.
CPC .......... *G05D 1/106* (2019.05); *B64C 2201/12* (2013.01); *B64C 2201/141* (2013.01); *B64C 2201/146* (2013.01)

(58) Field of Classification Search
CPC ....... G05D 2201/141; G05D 2201/146; A63K 1/00; F41F 3/00; F41F 3/06; B63G 11/00; B63G 11/025
See application file for complete search history.

(56) References Cited

U.S. PATENT DOCUMENTS

| | | | | |
|---|---|---|---|---|
| 9,798,329 | B2* | 10/2017 | Shattil | H04W 24/02 |
| 9,985,718 | B2* | 5/2018 | Frolov | H04B 7/18504 |
| 10,324,466 | B2* | 6/2019 | Erickson | G05D 1/0088 |
| 10,444,766 | B2* | 10/2019 | Shattil | B64C 39/024 |
| 10,831,197 | B2* | 11/2020 | Erickson | G08G 5/0008 |
| 2012/0205488 | A1* | 8/2012 | Powell | B64C 39/024 244/63 |
| 2014/0249693 | A1 | 9/2014 | Stark et al. | |
| 2016/0178317 | A1* | 6/2016 | Powell | F41F 3/07 89/1.81 |
| 2018/0036632 | A1 | 2/2018 | Poynter et al. | |
| 2018/0096455 | A1 | 4/2018 | Taylor et al. | |
| 2018/0221781 | A1 | 8/2018 | Green | |
| 2019/0035287 | A1* | 1/2019 | Priest | G08G 5/0091 |
| 2019/0043368 | A1* | 2/2019 | Priest | G08G 5/0069 |
| 2019/0355263 | A1* | 11/2019 | Priest | H04L 67/125 |

OTHER PUBLICATIONS

ISA/CA, International Search Report and Written Opinion, dated May 27, 2019, re PCT International Patent Application No. PCT/IB2019/051912.

Lu, James, and Benjamin Smith. "Autonomous navigation in drone racecourse." 2017 IEEE MIT Undergraduate Research Technology Conference (URTC). IEEE, 2017. [Abstract Only].

* cited by examiner

DYNAMIC RACE COURSE USING AN AIRCRAFT SYSTEM SWARM

FIELD

The present disclosure relates generally to aircraft systems. More particularly, the present disclosure relates to a dynamic race course using an aircraft system swarm.

BACKGROUND

Advancements in aircraft systems have allowed aircraft systems to be available for non-commercial use. For example, aircraft systems may be used in sporting events such as races, where pilots navigate aircraft systems through a race course. The race course may include gates and obstacles to delimit the possible paths the aircraft systems may take to complete the race.

SUMMARY

An aspect of the present disclosure is directed to a system for racing aircraft systems including: a plurality of autonomous synchronized unmanned aircraft systems configured to form a swarm at a race course through which the aircraft systems are to navigate; and a controller configured to be operatively coupled to at least one unmanned aircraft system of the swarm, the controller configured to control the swarm to form an element of the race course.

Another aspect of the present disclosure is directed to a method of adapting a race course for aircraft systems. The method includes controlling a swarm formed from a plurality of autonomous synchronized unmanned aircraft systems to form an element of the race course.

DETAILED DESCRIPTION

The present disclosure provides a method and system to adapt a race course using an aircraft swarm. The system includes a plurality of autonomous synchronized unmanned aircraft systems configured to form a swarm. The swarm is configured to be operatively coupled to a controller which controls the swarm to form elements of the race course. For example, the controller may control the swarm to form gates defining openings through which aircraft systems are to navigate, or obstacles or guidepaths around which the aircraft systems are to navigate. Further, the controller may control the swarm to form different elements during different laps of the race, or at predetermined times. Thus the race course is dynamic and may be readily adapted before or during a race.

Figure 1:
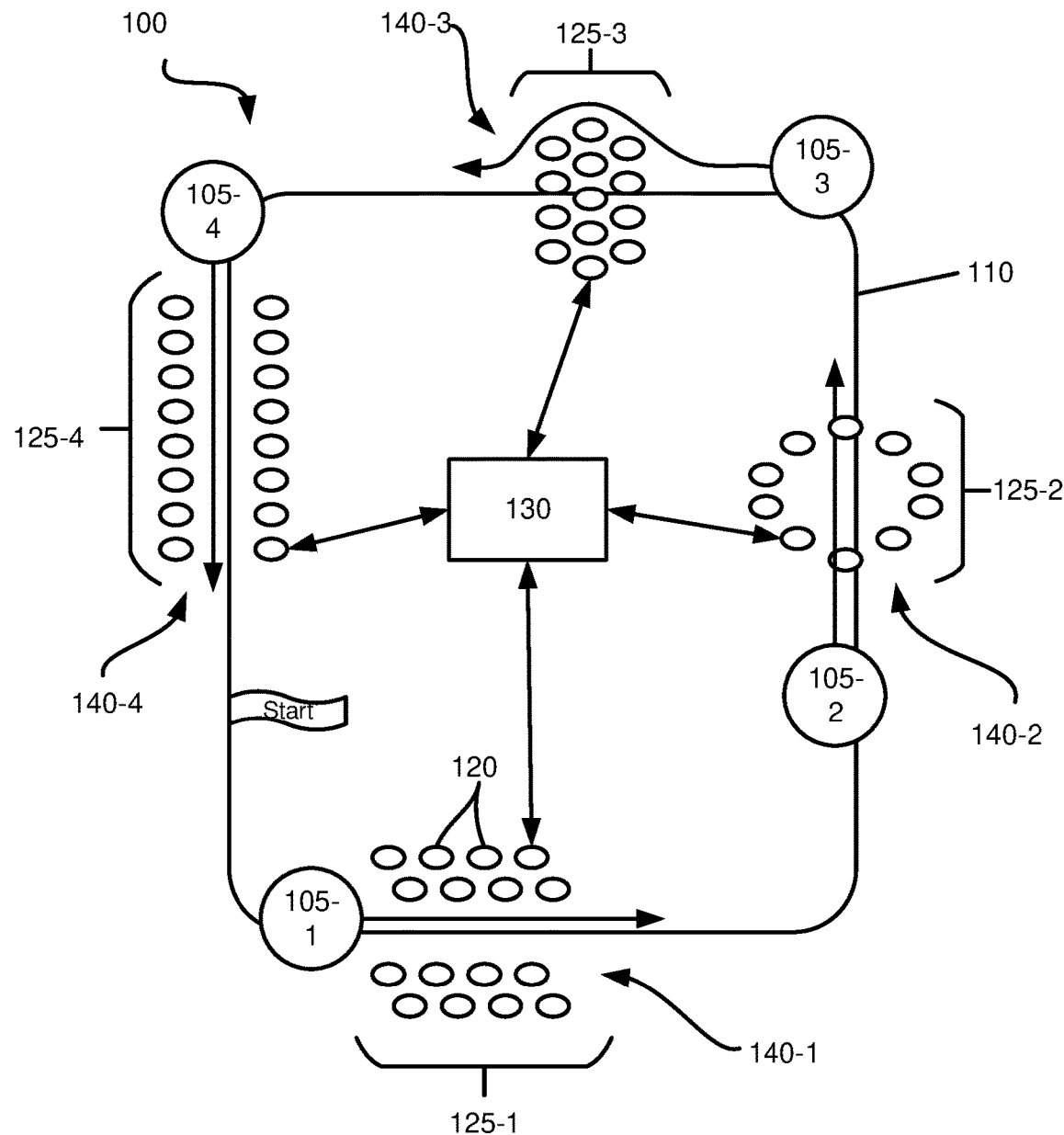
FIG. 1 shows a schematic diagram of an example system of a dynamic race course for racing aircraft systems.

FIG. 1 shows a system 100 for racing aircraft systems 105-1, 105-2, 105-3, and 105-4 (referred to collectively as aircraft systems 105 and generically as an aircraft system 105; this nomenclature is also used elsewhere herein). The system 100 includes a race course 110 through which the aircraft systems are to navigate. The system 100 further includes a plurality of autonomous synchronized unmanned aircraft systems 120 configured to form swarms 125-1, 125-2, 125-3, and 125-4. The system 100 further includes a controller 130 configured to be operatively coupled to at least one autonomous synchronized unmanned aircraft system 120 of each swarm 125. Generally, the controller 130 is configured to control the swarms 125 to form elements of the race course 110. The autonomous synchronized unmanned aircraft systems 120 may be, in some examples, drones, and hence are referred to herein as swarm drones 120. The elements formed by the swarms 125 may be referred to herein as dynamic elements. This is in contrast to fixed or stationary elements which may also be included in the race course 110.

The race course 110 may be a physical race course defined or delimited by physical elements comprising physical components or obstacles, such as gates, poles, blocks, or the like. Specifically, the elements may impose restrictions on the paths that the aircraft systems 105 take through the race course 110. The aircraft systems 105 are therefore configured to navigate through air space around the physical elements. The elements can be configured to track the passage of the aircraft systems 105, and may therefore include computing devices, sensors, receivers, and the like for receiving and processing signals or other information from the aircraft systems 105. For example, the elements may be configured to communicate with an aircraft system 105 to receive an identifier to provide updates to spectators or to other components of the system 100 regarding the location of the aircraft system 105. The elements may thereby act as checkpoints of the race course 110.

In other implementations, the race course 110 may be a mixed reality-based race course defined or delimited by physical aspects of the race course 110, such as the physical track or space in which the race is held (e.g. a race track, sporting stadium, open field, urban area, or the like), as well as virtual reality and augmented reality components, such as computer-generated obstacles, gates, poles, blocks, or the like. The aircraft systems 105 are therefore configured to navigate through the air space according to the mixed reality components. In further implementations, the race course 110 may be a combination of a physical course with mixed reality components. The race course 110 may be oriented horizontally, such that the aircraft systems 105 navigate horizontally through the course 110 at approximately the same distance or height from the ground, or the race course 110 may be oriented vertically such that the aircraft systems 105 navigate towards and away from the ground through the course, or the race course may include horizontal and vertical navigation components. In some implementations, the race course 110 may span airspace over a property or group of properties or other large area.

The controller 130 may include a central-processing unit (CPU), a microcontroller, a microprocessor, a processing core, a field-programmable gate array (FPGA), or similar. The controller 130 may include multiple cooperating processors. The controller 130 may cooperate with memory to execute instructions to realize the functionality discussed herein. The memory may include any combination of read-only memory (ROM), random-access memory (RAM), flash memory, magnetic storage, optical storage, and similar. All or some of the memory may be integrated with the controller 130. The controller 130 and memory may be implemented as a computer. For example, the controller 130 may implemented as a fixed or mobile computer or server system located on the ground. Alternately, the controller 130 may be integrated with a computing system of another aircraft system. Further. The controller 130 may be configured to communicate through satellites and/or high-altitude platform stations.

The controller 130 and the swarm drones 120 may each include a network interface configured for bidirectional data communications and can include a network adaptor and driver suitable for the type of network. Examples of suitable computer networks include internet protocol (IP) networks, such as intranet, a local-area network, a wide-area network, a virtual private network (VPN), a Wi-Fi network, a short range wireless network (e.g., Bluetooth™ or Bluetooth Low Energy™), the internet, combinations of such, or similar. The controller 130 and the swarm drones 120 may each include a port and controller for other types of communications, such as USB communications.

In operation, the controller 130 is coupled to at least one swarm drone 120 of the swarm 125 to form a dynamic element of the race course. The controller 130 may be configured to couple to and control multiple swarms 125 independently from each other. Alternately, the system 100 may include multiple controllers 130 (not shown), each configured to couple to and control one swarm 125.

In particular, the controller 130 may control the swarm 125-1 to form a gate 140-1, defining an opening through which the aircraft systems 105 are to navigate. For example, the gate 140-1 may be in the form of two horizontally spaced posts or fences. The two posts define a space there between through which the aircraft systems are to navigate. In another example, the controller 130 may control the swarm 125-2 may form a perimeter of a shape 140-2, such as a circle or a square or the like. The perimeter defines an opening therethrough, through which the aircraft systems are to navigate. Other gates types are also contemplated.

In other embodiments, the controller 130 may control the swarms 125 to form an obstacle around which the aircraft systems are to navigate. For example, the swarm 125-3 may form a filled shape 140-3, such as a square or an oval or the like. In some embodiments, the filled shape 140-3 may be 3-dimensional, such as a cube or a sphere. In other examples, the obstacle may be in the form of a series of weaving posts formed by the swarm 125, through which the aircraft are to navigate. Other obstacle types are also contemplated.

In further embodiments, the controller 130 may control the swarm 125-4 to form a border 140-4 of the race course.

Figure 2:
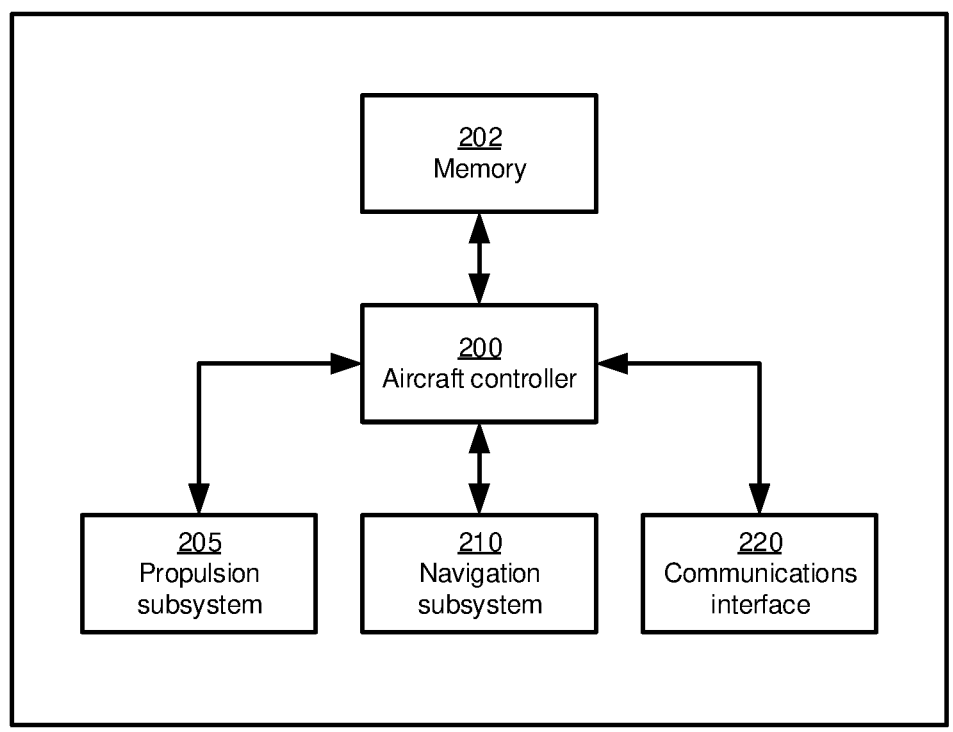
FIG. 2 shows a block diagram of an example aircraft system in the system of FIG. 1.

FIG. 2 depicts a block diagram of an aircraft system 105. The aircraft system 105 includes an aircraft controller 200 interconnected with a propulsion subsystem 205, a navigation subsystem 210, and a communications interface 220. The aircraft system 105 may be an unmanned aircraft system (UAS), including autonomously controlled UAS's and remotely piloted UAS's.

The aircraft controller 200 may include a central processing unit (CPU), a microcontroller, a microprocessor, a processing core, a field-programmable gate array (FPGA), or similar. The processor may include multiple cooperating processors. The aircraft controller 200 may cooperate with a memory 202 to execute instructions to realize the functionality discussed herein. The memory 202 may include any combination of read-only memory (ROM), random-access memory (RAM), flash memory, magnetic storage, optical storage, and similar. All or some of the memory 202 may be integrated with the controller 200. The controller 200 and memory 202 may be implemented as a computer. In particular, the controller 200 is configured to control the aircraft system 105 to navigate through the race course 110.

The propulsion subsystem 205 includes at least one engine and is configured to propel the aircraft system 105. For example, the propulsion subsystem 205 can include a propeller configured to be driven by the at least one engine to spin in an approximately vertical plane to provide thrust and lift (e.g. with fixed wings or the like), a rotor configured to be driven by the engine to spin in an approximately horizontal plane to provide lift, or other suitable mechanisms for propelling the aircraft system 105.

The navigation subsystem 210 can include sensors, beacons, localization systems, and the like to detect nearby aircraft systems 105 or the elements of the race course. For example, the navigation subsystem 210 can include RADAR sensors, LIDAR sensors, optical sensors or the like. The navigation subsystem 210 can further include a global positioning system (GPS) receiver for receiving and processing signals from GPS satellites to obtain position information, or a suitable wireless mesh network, such as Wi-Fi, Bluetooth, an optical network, or the like. The navigation subsystem 210 can be configured to generate map data indicative of the topography of the race course 110 and the elements detected on the race course 110. The map data may be generated, for example based on GPS data, data received from the sensors and localization systems, and the like. The navigation subsystem 210 can further be configured to generate navigation data for navigating the aircraft system through the race course 110 and the elements based on the map data. The navigation data can be used, for example, to allow the aircraft system 105 to navigate autonomously or to provide navigation data for display on a remote control system for a human operator. The navigation subsystem 210 can also cooperate with a repository, for example stored in the memory 202, for storing the map data and the navigation data.

The communications interface 220 includes suitable hardware (e.g. transmitters, receivers, network interface controllers and the like) allowing the aircraft system 105 to communicate with other computing devices, such as other aircraft systems 105, over links including direct links, or links that traverse one or more networks (e.g. both local and wide-area networks). The specific components of the communications interface 220 are selected based on the type of network or other links that the aircraft system 105 communicates over.

For example, in an autonomously controlled aircraft system 105, the controller 200 can be configured to control the navigation subsystem 210 to detect and store map data of the race course 110 and to generate navigation data for navigating a path through the race course 110 based on the map data. For example, updated map data may be pushed to the aircraft systems 105, the updated map data indicative of a change in the race course 110 (e.g. a new path through which the aircraft systems 105 are to navigate). In some examples, the updated map data may further include or be accompanied by updated mixed reality components. The navigation subsystem 210 may be configured to detect dynamic elements formed by a swarm 125 and generate navigation data for navigating around or through the dynamic element. The controller 200 can then control the propulsion subsystem 205 to move the aircraft system 105 to around or through the dynamic element according to the navigation data.

In another example, the aircraft system 105 may receive navigation data via the communications interface 220 from a remote control system operated by a human operator piloting the aircraft system 105 through the race course 110. When the navigation subsystem 210 detects a dynamic element, the controller 200 can communicate a notification to the remote control system via the communications interface 220. In other examples, the navigation subsystem 210 may include an optical image sensor, and may relay image data for display at the remote control system via the communications interface 220.

In some embodiments, the aircraft system 105 may further include a power management subsystem configured to receive power from a power transmitter. The power management subsystem may include a receiver to receive the power, a converter to convert the power into energy usable by the aircraft system 105, and an energy storage unit to store the usable energy. In some examples, one or more of the receiver, the converter, and the energy storage unit may be integrated. For example, the receiver may be integrated with the converter as a rectenna for receiving microwave radiation and rectifying the microwave radiation for conversion to direct current (DC) energy for use to power the aircraft system 105 (e.g. to power the engine for driving the propulsion subsystem 205). In other examples, the receiver may be configured to receive laser beams or other frequencies of electromagnetic radiation (e.g. low frequencies, infrared, ultraviolet, x-rays, gamma rays or the like). For example, the receiver and converter may be integrated as a solar cell configured to receive and convert solar energy. In the swarm each aircraft shall, along with receiving and converting the power for its own storage and use, transmit to adjacent aircraft so as to pass along the energy within the swarm for the same purpose.

In some implementations, the receiver may be located on an underside of the aircraft system 105, including a main body and wings, to increase the available surface area to receive power from the power transmitter. In other implementations, the receiver may cover the main body of the aircraft system 105, including a top side, to receive power from the power transmitter. The aircraft systems 105 may be configured to convert power received into energy and store the energy in the energy storage unit, or the aircraft systems 105 may convert the power into energy for powering the aircraft system 105 directly.

The energy storage unit is configured to receive energy from the converter and store the energy in an accessible form for the aircraft system 105. For example, the energy storage unit can include a rechargeable battery. In other examples, the energy storage unit can include using a superconducting magnetic energy storage (SMES) system. In particular, the SMES system stores energy in the form of magnetic field created by passing current through a superconductor (e.g. a superconducting coil). The SMES further includes a cryogenic coolant configured to cool the superconductor below its superconducting critical temperature, thereby reducing resistive losses when the SMES generates the magnetic field. The stored energy may subsequently be released for use to power the aircraft system 105 by discharging the coil. In further examples, the energy storage unit can include capacitors, inductors, or other suitable active and passive elements.

The power management subsystem can further be configured to detect power emitted from the power transmitter, measure power received by the receiver, and monitor energy levels in the energy storage unit, for example using sensors or the like. The energy and/or power data obtained from the sensors can be stored in a repository of the power management subsystem (e.g. stored in the memory 202) for further processing.

Figure 3A:
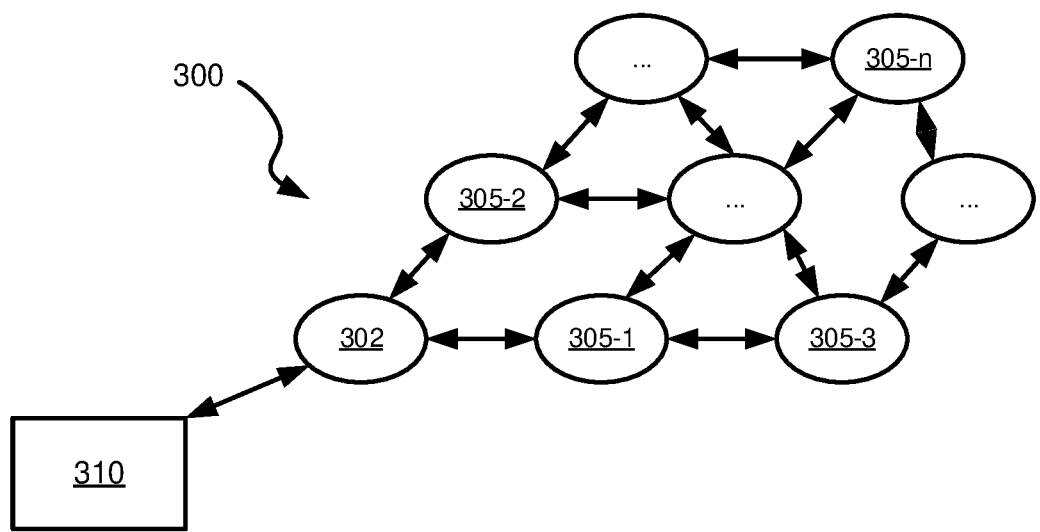
FIG. 3A shows a block diagram of an example swarm in the system of FIG. 1.

FIG. 3A depicts a block diagram of a swarm 300. The swarm 300 comprises a lead swarm drone 302 and follower swarm drones 305-1, 305-2, 305-3, . . . , to 305-n. The lead swarm drone 302 is configured to communicate with a controller 310 to receive instructions. The follower swarm drones 305 are configured to communicate with each other and with the lead swarm drone 302 to receive instructions. That is, each follower swarm drone 305 may communicate directly with the lead swarm drone 302, or may communicate with other follower swarm drones to create a network of communication channels. For example, the controller 310 may communicate instructions to the lead swarm drone 302 to form a dynamic element of the race course, and the instructions may be communicated from the lead swarm drone 302 to nearby follower swarm drones 305 to propagate through the network until all follower swarm drones 305 have received the instructions.

For example, the dynamic element of the race course may be a gate including two vertical posts through which aircraft systems are to navigate. The instructions may therefore include general spatial arrangement data defining the relative height, width, and depth of the two posts, and the spacing between the two posts.

The lead swarm drone 302, in turn, may communicate, directly, or via the swarm drone network, with the follower swarm drones 305 to determine specific spatial arrangement data based on the number of swarm drones 302 and 305 in the swarm 300. In some examples, the lead swarm drone 302 may communicate, directly, or via the swarm drone network, with the follower swarm drones 305 to first determine the number of swarm drones 302 and 305. For example, each swarm drone 302 and 305 may have a unique identifier, and hence the lead swarm drone 302 may count the number of unique identifiers communicated through the network. In other examples, the swarm drones 302 and 305 may count in a distributed manner.

The spatial arrangement data may define an array or other spatial configuration (e.g. non-regular) for forming the dynamic element based on the number of drones in the swarm 300. For example, a swarm of one lead swarm drone 302 and five follower swarm drones 305 may form two posts, each composed of a one by three array of swarm drones. In another example, a swarm of one lead swarm drone and twenty-nine follower swarm drones 305 may form two posts, each composed of a three by five array of swarm drones. In still further examples, the swarm may form a 3-dimensional array (e.g. each post composed of a three by three by five array of swarm drones). The specific spatial arrangement data may be determined by the lead swarm drone 302, by the controller 310 (e.g. after receiving an indication of the number of swarm drones from the lead swarm drone 302), by the lead swarm drone 302 and the follower swarm drones 305 in a distributed manner, or by another suitable computing device.

After determining the specific spatial arrangement data, the lead swarm drone 302 may communicate the specific spatial arrangement data to the follower swarm drones 305. The follower swarm drones 305 may then navigate to form the dynamic element defined by the specific spatial arrangement data. In some examples, each follower swarm drone 305 may have an assigned position in the array, for example, as defined by a unique identifier for each individual follower swarm drone 305, and hence each follower swarm drone 305 may navigate to its assigned position. In other examples, each follower swarm drones 305 may navigate to a nearest unoccupied position, and upon arrival, send an indication that the position is occupied to the lead swarm drone 302 and the other follower swarm drones 305. The positions may be defined, for example, relative to the lead swarm drone 302, which may have a specific assigned position. Thus, the swarm 300 is configured to form dynamic elements of the race course.

In further examples, the number of swarm drones 302 and 305 may be known by the controller, and hence the specific spatial arrangement data may be communicated directly to the lead swarm drone 302.

Figure 3B:
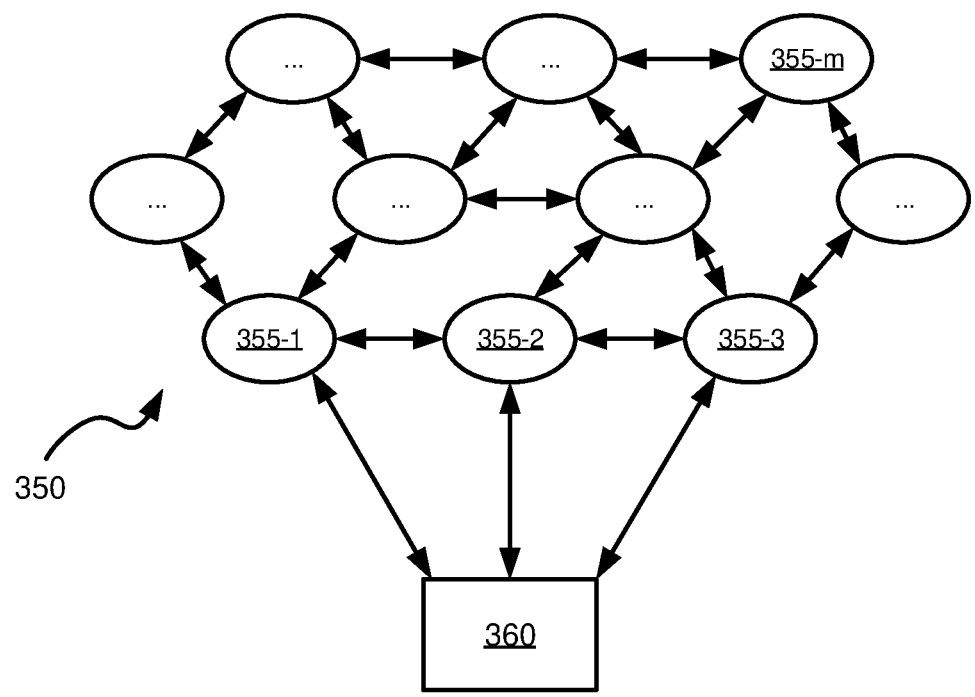
FIG. 3B shows a block diagram of another example swarm in the system of FIG. 1.

FIG. 3B depicts a block diagram of a swarm 350 comprising swarm drones 355-1, 355-2, 355-3, . . . , to 355-$m$. The swarm drones 355 are configured to communicate with a controller 360 and with each other to receive instructions. That is, each swarm drone 355 may communicate directly with the controller 360 or with other swarm drones 355 to create a network of communication channels. For example, the controller 360 may communicate instructions to a subset of nearby swarm drones 355. The subset of nearby swarm drones 355 may communicate with respective further subsets of nearby swarm drones to propagate through the network until all swarm drones 355 have received the instructions.

For example, the instructions may be to form a dynamic element of the race course may be a gate including two vertical posts through which aircraft systems are to navigate. The instructions may therefore include general spatial arrangement data defining the relative height, width, and depth of the two posts, and the spacing between the two posts. The controller 360 thus communicates directly, or via the swarm drone network, with the swarm drones 355 to determine specific spatial arrangement data based on the number of swarm drones 355 in the swarm 350. The spatial arrangement data may define an array or other spatial configuration (e.g. non-regular) for forming the dynamic element. For example, a swarm of six swarm drones 355 may form two posts, each composed of a one by three array of swarm drones. In another example, a swarm of thirty swarm drones 355 may form two posts, each composed of a three by five array of swarm drones. In still further examples, the swarm may form a 3-dimensional array (e.g. each post composed of a three by three by five array of swarm drones). The specific spatial arrangement data may be determined by the controller 360 (e.g. after receiving an indication of the number of swarm drones from the swarm drones 355), by the swarm drones 355 in a distributed manner, or by another suitable computing device.

After determining the specific spatial arrangement data, the controller 360 may communicate the specific spatial arrangement data to the swarm drones 355. The swarm drones 355 may then navigate to form the dynamic element defined by the specific spatial arrangement data. In some examples, each swarm drone 355 may have an assigned position in the array, for example, as defined by a unique identifier for each individual swarm drone 355, and hence each swarm drone 355 may navigate to its assigned position. In other examples, each swarm drone 355 may navigate to a nearest unoccupied position, and upon arrival, send an indication that the position is occupied to the other swarm drones 355 or to the controller 360. The positions may be defined, for example, relative to a landmark (e.g. a fixed element of the race course, or a combination of GPS position and a height above sea level). Thus, the swarm 350 is configured to form dynamic elements of the race course.

Figure 4:
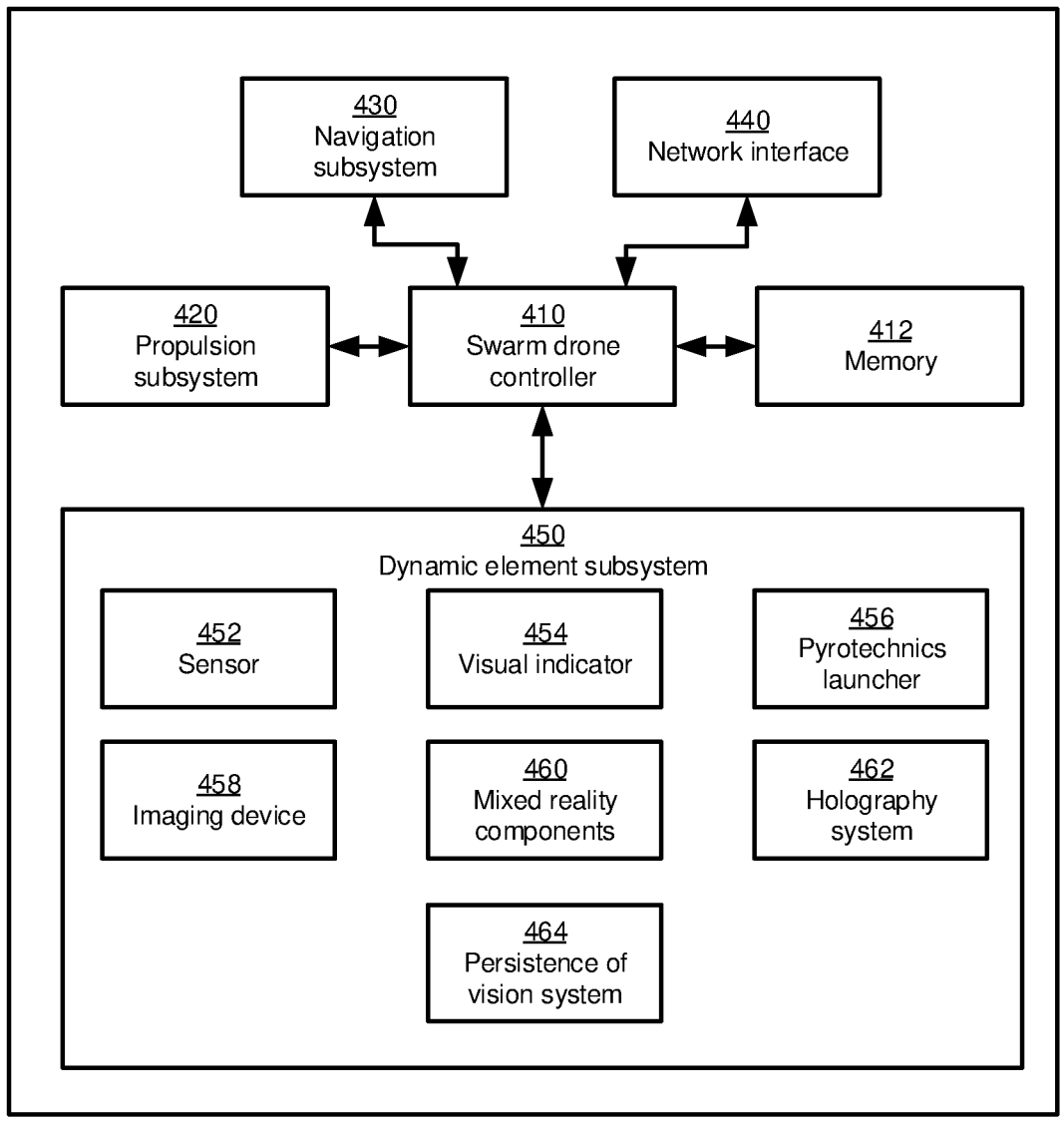
FIG. 4 shows a block diagram of an example swarm drone in the system of FIG. 1.

FIG. 4 depicts a block diagram of an example swarm drone 400. The swarm drone 400 includes a swarm drone controller 410 interconnected with a propulsion subsystem 420, a navigation subsystem 430, a network interface 440, and a dynamic element subsystem 450.

The swarm drone controller 410 may include a central-processing unit (CPU), a microcontroller, a microprocessor, a processing core, a field-programmable gate array (FPGA), or similar. The processor may include multiple cooperating processors. The swarm drone controller 410 may cooperate with a memory 412 to execute instructions to realize the functionality discussed herein. The memory 412 may include any combination of read-only memory (ROM), random-access memory (RAM), flash memory, magnetic storage, optical storage, and similar. All or some of the memory 412 may be integrated with the controller 410. The controller 410 and memory 412 may be implemented as a computer. In particular, the controller 410 is configured to control the swarm drone 400 to interact with other swarm drones as part of a swarm to form dynamic elements of the race course 110.

The propulsion subsystem 420 includes at least one engine and is configured to propel the swarm drone 400. For example, the propulsion subsystem 420 can include a propeller configured to be driven by the at least one engine to spin in an approximately vertical plane to provide thrust and left (e.g. in cooperation with fixed wings or the like), a rotor configured to be driven by the engine to spin in an approximately horizontal plane to provide lift, or other suitable mechanisms for propelling the swarm drone 400.

The navigation subsystem 430 is generally configured to allow the swarm drone 400 to navigate through airspace. The navigation subsystem 430 may therefore include one or more sensors, such as RADAR sensors, LIDAR sensors, optical sensors, combinations of the above, or the like. The navigation subsystem 430 can further include a GPS receiver for receiving and processing signals from GPS satellites to obtain position information.

The swarm drone 400 further includes a network interface 440 configured for bidirectional communications with the controller 130, or with other swarm drones 400.

The swarm drone 400 may further include a dynamic element subsystem 450 configured to manage formation of dynamic elements and interaction with aircraft systems 105 on the race course 110.

The dynamic element subsystem 450 can include a special purpose sensor 452 configured to detect nearby aircraft systems 105 in the race course 110. For example, the sensor 452 may be an optical sensor, a Bluetooth™ sensor, a near-field communication (NFC) sensor, or the like. In particular, the sensor 452 may be configured to detect signals emitted by the aircraft systems 105. In some examples, a single swarm drone 400, such as the lead swarm drone, may include a sensor 452. In other examples, the sensor 452 may be included on multiple swarm drones 400. The controller 130 may be configured to control the arrangement of swarm drones 400 within the swarm such that swarm drones 400 which include sensors 452 are closer to an expected location of nearby aircraft systems 105. For example, the swarm drones 400 having sensors 452 may be on the innermost rows of arrays forming a gate.

The controller 130 may be configured to receive an indication of the nearby aircraft system 105 from the swarm drone 400. In response, the controller 130 may control the swarm to acknowledge the nearby aircraft system 105. For example, the sensors 452 may be configured to detect multiple nearby aircraft systems 105 such that the controller 130 may differentiate between the aircraft systems 105 (e.g., by extracting an aircraft system identifier from the received signals). Thus, the controller 130 may count the number of laps each aircraft system 105 has completed, to rank the aircraft systems 105 during and after the race to provide a real-time leaderboard, and the like. Further, the controller 130 may be configured to control the swarm based on feedback from the sensors 452. For example, the controller 130 may control the swarm to form a different element when all the aircraft systems 105 have passed a given sensor 452.

The dynamic element subsystem 450 may further include a visual indicator 454. The visual indicator 454 may be a light, such as a light-emitting diode (LED), an LED array, or the like. In other embodiments, the visual indicator 454 may be a color swatch on the body of the swarm drone 400. A visual indicator 454 may be included on a single swarm drone 400, such as the lead swarm drone, or the visual indicator 454 may be included on multiple swarm drones 400. In some embodiments, the controller 130 may be configured to activate the visual indicator 454 to acknowledge the nearby aircraft system 105 (e.g., in response to detection of the nearby aircraft system 105 by the sensor 452). For example, the controller 130 may turn the light on, or change the light from one color to another color to acknowledge the nearby aircraft system. Where multiple swarm drones 120 have visual indicators 454, the controller 130 may control the visual indicators 454 as a series to acknowledge the nearby aircraft system. For example, the controller 130 may change the series of lights from multi-colored to a single color to acknowledge the nearby aircraft system. In another example, the controller 130 may control the series of light to display a particular sequence or pattern. In another example, the controller 130 may control the arrangement of the swarm drones 120 within the swarm so that the color of the swarm drones forms a certain pattern. As well, the lights may be independently operated as individual pixels in the entire swarm to form images, moving images or 3D video, or the appearance of movement of a shape or character.

The dynamic element subsystem 450 may further include a pyrotechnics launcher 456. The pyrotechnics launcher 456 launches pyrotechnics, such as fireworks, flare lights, smoke signals or the like. The pyrotechnics launcher 456 may be included on a single swarm drone 400, such as the lead swarm drone, or the pyrotechnics launcher 456 may be included on multiple swarm drones 400. The controller 130 may be configured to control the arrangement of the swarm drones 400 within the swarm such that swarm drones 400 having a pyrotechnics launcher 456 may launch the pyrotechnics to form a dynamic element, such as a gate or an obstacle, of the race course 110. By using the pyrotechnics to form the element, fewer swarm drones 400 may be required to form the swarm. In some embodiments, the pyrotechnics launcher 456 may be recoilless so as to maintain the swarm drone 400 in place during launch. In other embodiments, the pyrotechnics launcher 456 may have recoil, and the controller 130 may control the swarm drone 120 in proportion to the recoil to maintain the formation of the swarm 400.

The dynamic element subsystem 450 may further include an imaging device 458, such as a video camera to record video or capture still images. The imaging device 458 may be included on a single swarm drone 400, such as the lead swarm drone, or the imaging device 458 may be included on multiple swarm drones 400. In some embodiments, multiple swarm drones 400 may form a system of imaging devices 458 to record a series of video or capture a series of still images from multiple views. The series of video or still images may be sent to an imaging processing engine for further processing. In other examples, the images or video from the imaging device 458 may be used to spectate the race.

One or more of the swarm drones 400 may be combined with mixed reality components 460. The mixed reality components 460 may be configured to generate virtual reality, augmented reality, and augmented virtuality visualizations. The mixed reality components 460 may also be configured to interface with receivers, for example in a viewing area for the race course 110. The receivers may be used by spectators of the race to spectate the race, including the virtual reality and augmented reality visualizations. For example, the receivers may include augmented reality or virtual reality headsets, glasses, smartphones, or the like.

One or more of the swarm drones 400 may include a holography system 462. The holography system 462 may be configured to project a hologram forming the element of the race course 110. For example, the holography system 462 may project a hologram depicting an obstacle or another dynamic element of the race course 110.

One or more of the swarm drones 120 may include a persistence of vision system 464. In particular, the persistence of vision system 464 methodologies and principles to create retinal persistence or persistence of impression images. The persistence of vision system 464 may be configured to project a persistent image forming the element of the race course 110. For example, the persistence of vision system 464 may project a persistent image depicting an obstacle or another dynamic element of the race course 110.

Figure 5:
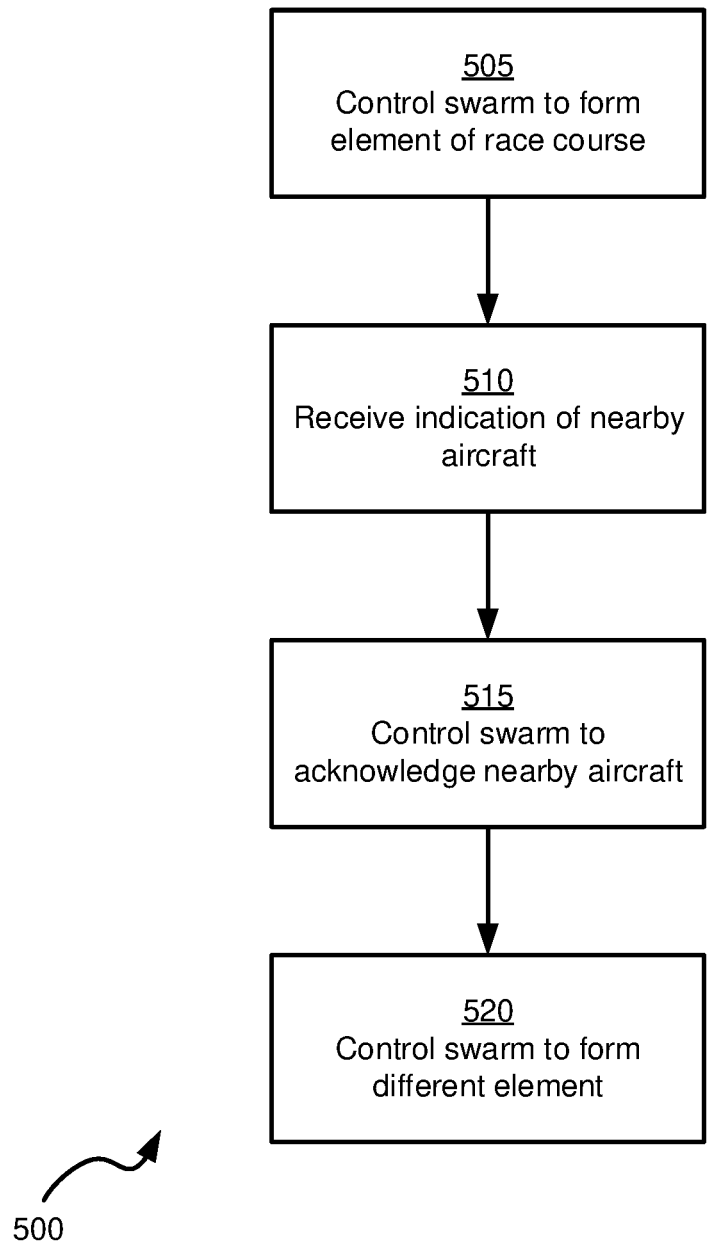
FIG. 5 shows a flowchart of an example method of adapting a race course using an aircraft system swarm.

FIG. 5 depicts a flowchart of a method 500 of adapting a race course for aircraft systems. In order to assist in the explanation of the method 500, it will be assumed that the method 500 is performed using the system 100, although it is contemplated that the method 500 can also be performed by other suitable systems.

At block 505, the controller 130 controls the swarm 125 formed from a plurality of autonomous synchronized unmanned aircraft systems (swarm drones) 120 to form a dynamic element of the race course.

In some embodiments, the controller 130 may send specific spatial arrangement data to the swarm 125 based on a pre-determined number of swarm drones 120 in the swarm 125. The controller 130 may communicate the data to a lead swarm drone, or to a subset of swarm drones 120 to propagate the data through the swarm 125, or the controller 130 may communicate the data to each swarm drone 120 individually. The specific spatial arrangement data may include assigned positions for each swarm drone 120, or may include position data which may be filled by any swarm drone 120 in the swarm 125.

In other embodiment, the controller 130 may request the number of swarm drones 120 in the swarm 125 for determining the specific spatial arrangement data. In further embodiments, the controller 130 may send general spatial arrangement data, such as a relative length, width, height, depth, spacing, and the like for forming the dynamic element. The general spatial arrangement data may then be processed by the swarm 125 to form the element.

In some embodiments, the element may be a gate through which the aircraft systems are to pass. In particular, the gate may define an opening through which the aircraft systems are to navigate, such as spaced apart posts, or a perimeter of a shape. In other embodiments, the element may be an obstacle around which the aircraft systems are to navigate. In further embodiments, the element may be a border of the race course. In other embodiments, at least one swarm drone 120 may include a pyrotechnics launcher configured to launch pyrotechnics such as fireworks, flare lights, smoke signals and the like. The controller 130 may be configured to control the swarm drone 120, and in particular the pyrotechnics launcher to launch pyrotechnics to form the element. In further embodiments, at least one swarm drone 120 may be combined with mixed reality components.

At block 510, the controller 130 may receive an indication of a nearby aircraft system 105. For example, the controller 130 may receive the indication from a fixed element of the race course, or from a swarm 125.

At block 515, in response to the indication received at block 510, the controller 130 may control the swarm to acknowledge the nearby aircraft system 105. For example, the controller 130 may control the swarm to acknowledge the nearby aircraft system by activating a visual indicator of at least one swarm drone 120 in the swarm 125.

At block 520, the controller 130 may control the swarm 125 to form different elements during different laps of the race course. Thus, the aircraft systems 105 may be required to navigate different paths through different elements during different laps of the race course.

The system and method to adapt a race course using an aircraft swarm allows for a dynamic and adaptable race course. In particular, the controller may control the swarm to form elements of the race course. The elements may be in the form of gates defining openings, obstacles, a border of the race course and the like. In particular, the elements delimit the race course and the paths that aircraft systems may navigate to complete the race course, thus allowing the race course to be customized between laps of a race, or between different race events. Further, the controller may control the swarm to interact with the racing aircraft systems, for example, to detect a nearby aircraft system, to use imaging devices to capture still images or record videos of the race, and to acknowledge nearby aircraft systems.

Persons skilled in the art will appreciate that there are yet more alternative implementations and modifications possible. For example, rather than aircraft, the system may include watercraft forming a swarm to allow creation of dynamic elements in a water-based, including an underwater, race course. In further examples, the system may include spacecraft forming a swarm to allow creation of dynamic elements in a space-based race course. Persons skilled in the art will appreciate that the above examples are only illustrations of one or more implementations. The scope, therefore, is only to be limited by the claims appended hereto.

The invention claimed is:

1. A system for racing first aircraft systems, the system comprising:
 a plurality of autonomous synchronized unmanned second aircraft systems configured to form a swarm at a race course through which the first aircraft systems are to navigate; and
 a controller configured to be operatively coupled to at least one unmanned second aircraft system of the swarm, the controller configured to control the swarm to form a physical, projected, or virtual obstacle of the race course, wherein the obstacle imposes restrictions on navigation paths of the first aircraft systems through the race course.

2. The system of claim 1 wherein the obstacle is a gate through which the first aircraft systems are to pass.

3. The system of claim 1 wherein the obstacle is a block around which the first aircraft systems are to navigate.

4. The system of claim 1 wherein the obstacle forms a border of the race course within which the first aircraft systems are to navigate.

5. The system of claim 1 wherein:
 at least one unmanned second aircraft system in the swarm comprises a sensor to detect a nearby first system; and
 the controller is further configured to receive an indication of the nearby first aircraft system and in response control the swarm to acknowledge the nearby first aircraft system.

6. The system of claim 5 wherein at least one unmanned second aircraft system in the swarm comprises a visual indicator, and the controller is further configured to activate the visual indicator to acknowledge the nearby first aircraft system.

7. The system of claim 1 wherein at least one unmanned second aircraft system in the swarm comprises a pyrotechnics launcher, and wherein the controller is further configured to control the pyrotechnics launcher to launch pyrotechnics to form the obstacle of the race course.

8. The system of claim 7, wherein the pyrotechnics launcher is recoilless.

9. The system of claim 7, wherein the pyrotechnics launcher recoils.

10. The system of claim 1 wherein at least one unmanned second aircraft system in the swarm comprises an imaging device.

11. The system of claim 1 wherein at least one unmanned second aircraft system in the swarm is combined with mixed reality components.

12. The system of claim 1 wherein at least one unmanned second aircraft system in the swarm comprises a holography system configured to project a hologram forming the obstacle of the race course.

13. The system of claim 1 wherein at least one unmanned second aircraft system in the swarm comprises a persistence of vision system configured to project a persistent image forming the obstacle of the race course.

14. A method of adapting a race course for first aircraft systems to navigate through, the method comprising:
 controlling a swarm formed from a plurality of autonomous synchronized unmanned second aircraft systems to form a physical, projected, or virtual obstacle of the race course, wherein the obstacle is to impose restrictions on navigation paths of the first aircraft systems through the race course.

15. The method of claim 14 wherein the obstacle is a gate through which the aircraft systems are to pass.

16. The method of claim 14 wherein the obstacle an obstacle around which the aircraft systems are to navigate.

17. The method of claim 14 wherein the obstacle is a border of the race course.

18. The method of claim 14 wherein at least one unmanned second aircraft system in the swarm is combined with mixed reality components.

19. The method of claim 14 further comprising:
 receiving an indication of a nearby first aircraft system; and
 in response to the indication, controlling the swarm to acknowledge the nearby first aircraft system.

20. The method of claim 19 wherein controlling the swarm to acknowledge the nearby first aircraft system comprises activating a visual indicator of at least one unmanned second aircraft system in the swarm.

21. The method of claim 14 wherein at least one unmanned second aircraft system of the swarm comprises a pyrotechnics launcher, and wherein controlling the swarm to form the obstacle comprises controlling the pyrotechnics launcher to launch pyrotechnics to form the obstacle.

22. The method of claim 14 further comprising controlling the swarm to form different obstacles during different laps of the race course.

* * * * *